United States Patent [19]

Obrecht

[11] Patent Number: 4,554,983
[45] Date of Patent: Nov. 26, 1985

[54] OSCILLATING FRICTION RING ASSEMBLY FOR APPLYING AXIAL THRUST TO A SHAFT

[75] Inventor: Georges Obrecht, Pont de Claix, France

[73] Assignee: Alsthom-Atlantique, Paris, France

[21] Appl. No.: 625,157

[22] Filed: Jun. 27, 1984

[30] Foreign Application Priority Data

Jun. 27, 1983 [FR] France ............................ 83 10569
Aug. 3, 1983 [FR] France ............................ 83 12808

[51] Int. Cl.⁴ ............................................ E21B 4/02
[52] U.S. Cl. ................................. 175/107; 384/223
[58] Field of Search ................ 175/107, 321, 322; 166/241; 188/71.5, 83, 166; 384/424, 223, 275, 906; 415/123, 503

[56] References Cited

U.S. PATENT DOCUMENTS

| 3,649,093 | 3/1972 | Muratore et al. ............ 384/905 X |
| 3,858,668 | 1/1975 | Bell ...................................... 175/107 |
| 4,485,880 | 12/1984 | Makohl ............................... 175/107 |

FOREIGN PATENT DOCUMENTS

| 2916347 | 10/1980 | Fed. Rep. of Germany . |
| 1262511 | 4/1961 | France . |
| 1402270 | 5/1965 | France . |
| 1410608 | 8/1965 | France . |
| 2043893 | 2/1971 | France . |
| 2110529 | 5/1972 | France . |
| 2157206 | 6/1973 | France . |
| 2258104 | 8/1975 | France . |
| 2433130 | 3/1980 | France . |
| 2012378 | 7/1979 | United Kingdom . |
| 2073285 | 10/1981 | United Kingdom . |

Primary Examiner—Stephen J. Novosad
Assistant Examiner—Thuy M. Bui
Attorney, Agent, or Firm—Sughrue, Mion, Zinn, Macpeak & Seas

[57] ABSTRACT

In a turbodrill, there is no guarantee that a rotary friction ring (1) is or will remain exactly at right angles to its shaft (2). Wear against a co-operating non-rotary friction ring (6) is thus uneven, and if the surrounding medium is drilling mud, small abrasive grains can penetrate between the friction rings where they are not in contact and score them where they are in contact. The non-rotary friction ring is mounted on a moving sleeve (28) which is connected to a fixed sleeve (33). A spring (17) urges the friction rings into contact. An arrangement of balls in axial grooves between the sleeves allows the moving sleeve (28) to tilt slightly relative to the fixed sleeve (33). The non-rotary friction ring can thus wobble to keep in good contact with the rotary friction ring.

9 Claims, 6 Drawing Figures

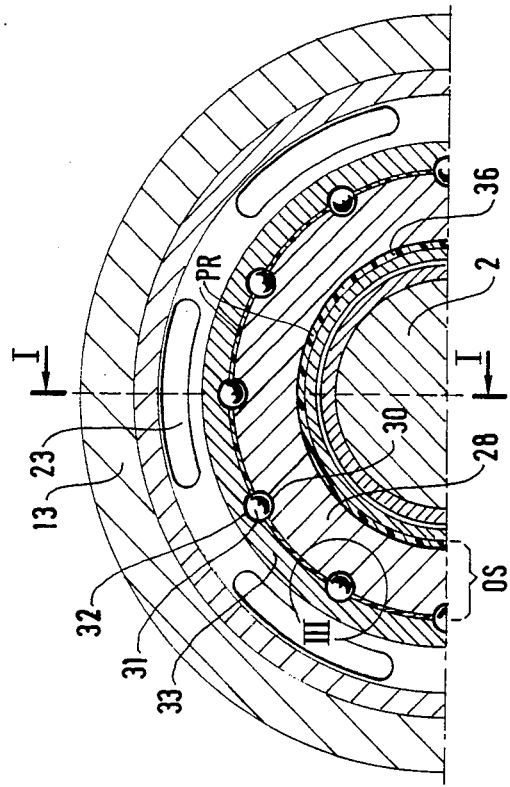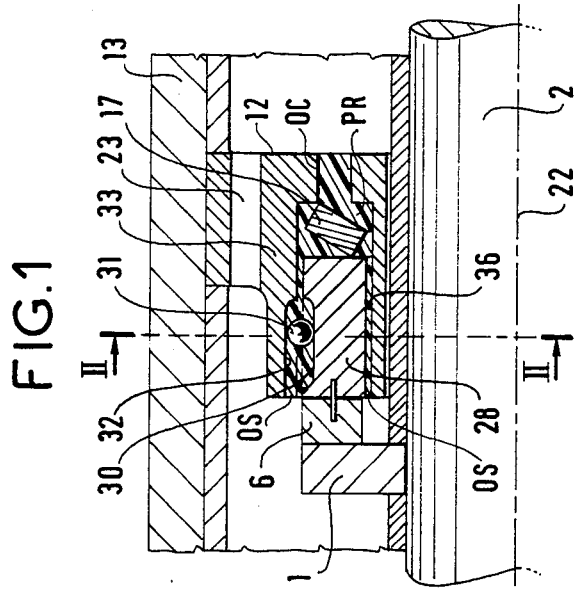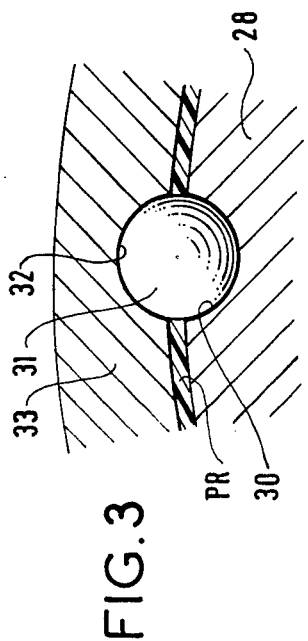

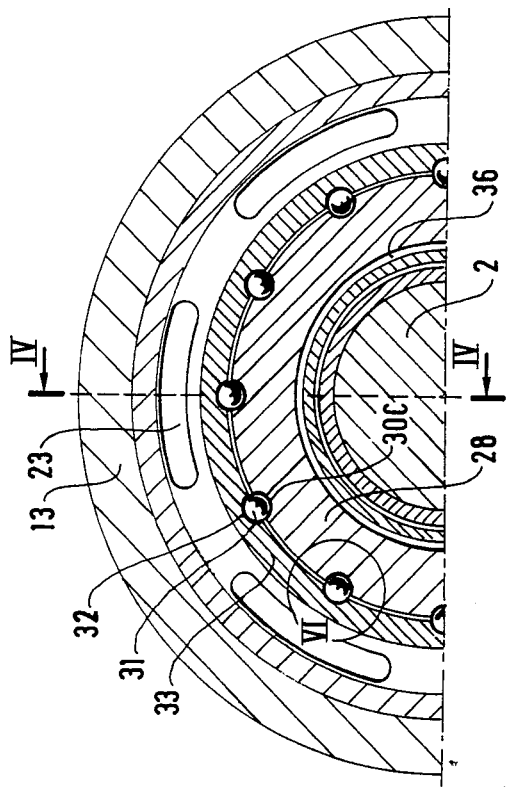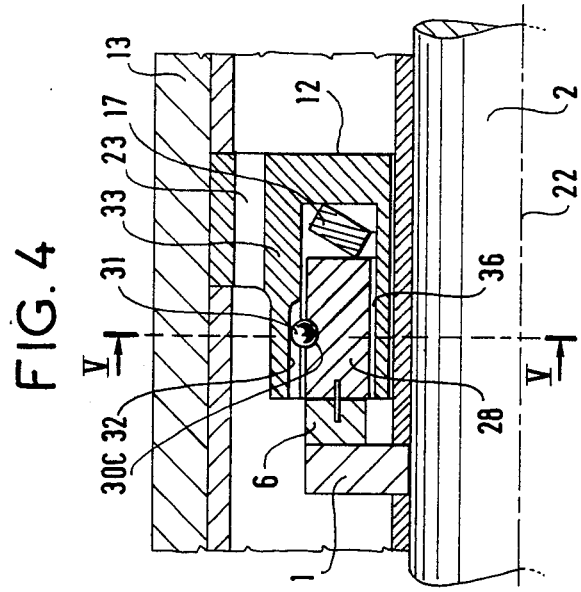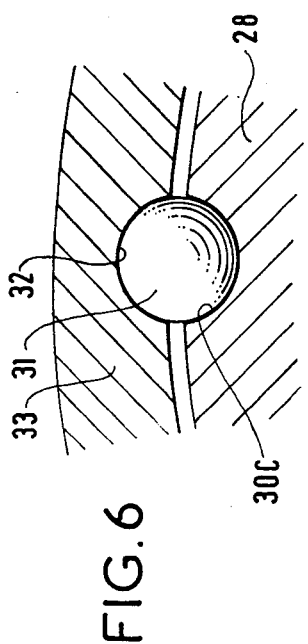

OSCILLATING FRICTION RING ASSEMBLY FOR APPLYING AXIAL THRUST TO A SHAFT

The present invention relates to an oscillating friction ring assembly for applying axial thrust to a shaft, the assembly comprising:

a first subassembly comprising rotary parts which are rotatable relative to an outer body and which are driven by a shaft which is itself rotatable about a shaft axis, the shaft axis defining an axial direction, and the first subassembly being suitable for transmitting axial thrust to the shaft; and a second subassembly comprising non-rotary parts connected to the said outer body in such a manner as to prevent the non-rotary parts from rotating about the said axis while enabling the non-rotary parts to transmit axial thrust to the said outer body, the said first and second subassemblies co-operating with each other to prevent large axial displacement of the shaft relative to the body while allowing the shaft to rotate relative to the body;

the said first subassembly and the said second subassembly each including a respective friction ring having a plane friction surface lying in a plane substantially perpendicular to the said axis, each friction surface being in the form of a circular annulus disposed coaxially about the shaft and being made of a hard material, and the friction surface of each subassembly being disposed to bear against the friction surface of the other subassembly, with each friction ring of the second subassembly including only one friction surface located at an axial end face of the friction ring referred to as a "front" end face, and with the axially opposite end face of the friction ring being referred to as a "rear" end face;

the friction ring of the said second subassembly being mounted in co-operation with a corresponding resilient thrust member engaging the rear face thereof to urge the friction ring axially forwardly to bear continuously against the friction ring of the said first subassembly, thereby enabling small axial displacements of the said friction rings relative to the said outer body; and a frame constituting a rear thrust point for the resilient thrust member;

means being provided to prevent the friction ring of the second subassembly from rotating about the said shaft axis relative to the said frame, and to guide axial displacement of the friction ring.

BACKGROUND OF THE INVENTION

Such friction ring assemblies are used, in particular, for downhole drill motors where the shaft is the shaft of a turbine and the outer body is the fixed tubular body of the turbine. The said first subassembly then includes an axial succession of friction rings, each of which may have two friction surfaces, one on each of two opposite faces, with each friction surface co-operating with the friction ring of a respective second subassembly which is resiliently biased from a respective frame.

The term "turbodrill" may be applied to such a turbine motor when equipped with a suitable tool. Turbodrills need to be equipped with abutment surfaces for transmitting large longitudinal forces between the rotating shaft and the outer body. The friction rings are made of steel and the friction surfaces are treated to have suitable surface hardness and a low coefficient of friction. They may, for example, be constituted by tungsten carbide, aggregations of diamonds, or hard metal alloy. The resilient axial thrust members serve to distribute the load over the various friction rings, and to damp axial shock and vibration.

It is easier to manufacture a rigid single part friction ring than it is to manufacture a plurality of independent friction tabs which have sometimes been used to replace a friction ring in the second subassemblies.

One such prior art friction ring assembly is described in French patent publication No. 2 157 206 (Alsthom), and also in the corresponding U.S. Pat. No. 3,858,668 (Jean Bell).

In this prior art assembly, the friction rings of the first subassemblies, ie. the rings which rotate with the shaft, have their rear (ie. non-friction) surfaces mounted on a layer of elastomer which constitutes the said resilient thrust member. The rings are prevented from rotating relative to the shaft by the adherence of the said elastomer layer or by being keyed to the shaft, and any axial displacement is accompanied by high levels of friction.

This prior art assembly has considerably increased the service life of turbodrills, but wear on the friction surfaces still limits the service life excessively. This wear is greatly increased when the surrounding medium is a drilling mud transporting abrasive particles.

Preferred embodiments of the present invention provide an oscillating friction ring assembly for transmitting resilient axial thrust to a shaft while increasing service life, particularly in the presence of drilling mud. Such embodiments are capable of transmitting large axial forces and are simple to manufacture.

SUMMARY OF THE INVENTION

The present invention provides an assembly as defined above and including the improvement whereby the second subassembly further includes:

a moving guide sleeve which is movable relative to the frame, the moving sleeve being coaxial with the said shaft and having the friction ring of the second subassembly rigidly fixed thereto; and a fixed guide sleeve which is fixed relative to the frame, the fixed sleeve being coaxial with and axially co-extensive with the moving sleeve, radial play being provided between the pair of sleeves to enable the moving ring to tilt slightly about an axis which is perpendicular to the said shaft axis, which intersects the shaft within the axial extent of the sleeves, and which may rotate about the shaft, where such tilting could be due, in particular, to the possibility of the surface of first subassembly friction ring being out-of-true, such that permanent axial thrust between the pair of friction rings transmits a wobble to the second subassembly friction ring;

the pair of sleeves including a plurality of pairs of adjacent ball-receiving housings hollowed out in their facing surfaces, with at least one of the housings in each pair being in the form of an axially extending groove;

a ball being placed in each of the said pairs of ball-receiving housings with sufficient play to enable easy axial sliding of the moving sleeve relative to the fixed sleeve by means of the balls rolling on the walls of the said grooves, but with the said play being small enough to prevent angular movement of the moving sleeve relative to the fixed sleeve about the axis of the said shaft, thereby constituting the said means for preventing the second subassembly friction ring from rotating, while additionally facilitating the said periodic tilting of the moving sleeve relative to the fixed sleeve;

ball-centering means being provided to cause the balls to be disposed around a circle which is coaxial with both the moving sleeve and the fixed sleeve when said sleeves are themselves coaxial, thereby enabling the moving sleeve to tilt about any tilt axis by appropriate movement of the balls in their housings.

The guide sleeves could be of various shapes: for example they could be in the form of squirrel cages with axially extending bars including the ball-receiving housings and interconnected by end rings. However, for ease of manufacture, both sleeves and the resilient thrust member are preferably substantially symmetrical about the shaft axis.

Further, it is preferable for the fixed sleeve to surround the moving sleeve since the frame is fixed to the outer body, thereby facilitating assembly of the assembly on the shaft prior to the outer body encasing the whole.

As already suggested above, the present invention stems mainly from a desire to reduce friction ring wear. It turns out that at least a portion of this wear is due to the fact that co-operating friction surfaces were not exactly co-planar so that they came into contact at certain points only.

It appears that wear was thus increased by the thrust forces being unevenly applied and also by fine abrasive particles penetrating between the friction surfaces at points where they were not in contact (at least when the surrounding medium is drilling mud). It thus appeared desirable to mount one of the friction rings so that it could wobble by tilting about all possible transverse axes during each revolution of the shaft, thereby ensuring contact over the entire surface of each friction ring, even when the other friction ring is mounted slightly out-of-true. A wobble mounting is desirable because it is difficult to ensure that all friction surfaces in a turbodrill are substantially true. Further, even supposing that ideally true surfaces could be achieved (at greatly increased manufacturing cost) there would still be no guarantee that the friction surfaces would remain ideally true during the service life of the drill. This is because large bending forces can arise in operation between the shaft and the fixed body of a turbodrill, due to curvature (whether desired or otherwise) of a bore hole being drilled. It therefore appeared desirable to the present inventors to provide a wobble mounting for one of the friction surfaces in each co-operating pair of friction surfaces. It may be observed that such a mounting is provided to some extent in the above-mentioned Bell patent, but that that arrangement is essentially concerned with providing a small amount of axial freedom without oscillation under the effect of a large axial force. As a result, the stiffness of the elastomer used or the metal on metal wear of the guide components prevent tilting taking place easily. It would seem to be very difficult to remedy this defect by merely reducing the said stiffness or the said metal on metal friction since it is important (also for reasons of reducing wear) to prevent the friction rings moving angularly about the shaft axis relative to the other parts of their own subassembly. Such axial rotation gives rise to various slip-stick phenomena causing sudden jolts that can lead to damage and even to breakages.

Ball slideways are also known for enabling a shaft to slide freely in a sleeve while preventing any relative rotation by guiding the balls in facing longitudinally extending slots. However, such known slideways are considered as preventing any tilting between the shaft and the sleeve either. Such prior art slideways are described in French patent publication No. 2 258 104 (Magnetic Seal) and in British patent publication No. 2 073 285 (Zahnradfabrick).

In the present invention, it has been discovered that a system similar to such a ball slideway can not only make such tilting possible, but also facilitates such tilting, and that this can be achieved without any unusual play. This facility for tilting in spite of high levels of axial and of circumferential force derives in particular from the fact such tilting causes each ball to move axially along a groove, which is facilitated by the ball rolling in the groove. The direction and magnitude of such ball displacement is different for each pair of ball-receiving housings.

BRIEF DESCRIPTION OF THE DRAWINGS

Two embodiments of the invention are described by way of example with reference to the accompanying drawings, in which:

FIG. 1 is a half axial section through a first assembly in accordance with the invention and on a plane I—I of FIG. 2;

FIG. 2 is a half radial section of the assembly shown in FIG. 1 on a planeII—II of FIG. 1;

FIG. 3 shows a detail III of FIG. 2 on a larger scale;

FIG. 4 is a half axial section through a second assembly in accordance with the invention and on a plane IV—IV of FIG. 5;

FIG. 5 is a half radial section of the assembly shown in FIG. 4 on a plane V—V of FIG. 4; and FIG. 6 shows a detail VI of FIG. 5 on a larger scale.

MORE DETAILED DESCRIPTION

The first assembly described by way of example comprises a first subassembly of rotary parts which are rotatable relative to an outer body 13 and which are driven by a shaft 2 about an axis 22, together with a second subassembly of non-rotary parts which are connected to the outer body in such a manner as to prevent their rotating about the axis while enabling them to transmit axial thrust to the outer body.

The first subassembly includes a plurality of friction rings such as 1 disposed successively along the shaft, and each capable of being provided with two oppositely directed friction surfaces (only one of which is shown) each of which rubs against the single friction surface of a co-operating friction ring such as 6 which forms part of the second subassembly. The second subassembly also includes resilient thrust members 17 bearing against the rear faces of the friction rings 6 to urge them axially forwards to maintain permanent thrust on the friction rings 1 of the first subassembly, while nonetheless enabling small axial displacements of the friction rings. The thrust members 17 also bear against respective frames 12. In accordance with the invention, the second subassembly further includes fixed guide sleeves 33 which are fixed relative to the frame 12 and moving guide sleeves 28 which are movable relative to the frames 12 and which are coaxial with the shaft 2. Each moving guide sleeve 28 bears rigidly against a corresponding one of the friction rings 6. Moving grooves 30 and fixed grooves 32 extend axially in the facing surfaces of the moving sleeves and fixed sleeves respectively. A ball 31 is disposed in each pair of facing grooves.

The balls have sufficient play to enable easy axial displacement of the moving sleeves relative to the fixed sleeves. Although the play is not slack enough to permit the moving sleeve to move in rotation about the shaft axis, it does enable the moving sleeve to readily perform the above-mentioned periodic tilting.

Naturally, the stiffness of the axial thrust member is chosen to be small enough to readily permit this tilting by variable deformation along its perimeter. In the example described, the stiffness is chosen to be smaller than it would be if it were only necessary to accommodate the expected axial displacements. For example, the axial thrust member may be constituted by a frustoconical steel washer, sometimes known as a "Belleville" washer.

In the example described, the shaft 2 is the turbine shaft of an underground or "downhole" drilling motor, the outer body 13 is the tubular body of the turbine, and the frame 12 fixed to the body 13 is in the form of an annular plate which is perforated by openings 23 to enable drilling mud to flow axially and drive the turbine.

Although the friction rings are preferably made in the form of add-on parts, it is clear that they could be made in the form of integrated portions of more extensive parts, eg. including the shaft 2 or the moving sleeve 28, as appropriate.

The following arrangements are preferably adopted, depending on circumstances:

The grooves may include end stops to facilitate positioning the balls during assembly and to prevent them from moving out of the grooves.

The periodic tilt angle A expressed in radians imposed on the ring 6 by the maximum expected unwanted tilt of the friction ring 1 should not be too great. The friction rings are designed and installed for this angle being less than 1/100-th of a radian. This value is easily achieved. Further, in turbine drills of the usual type, it is very rare that possible curvature of the well could increase this angle to a greater value.

As shown in FIGS. 2 and 3, the grooves are of semicircular cross section.

The distance R from the center of each ball to the axis of the shaft is a function of the nominal diameter of the assembly, and may be from 15 mm to 200 mm. The balls have 0.05 mm to 0.2 mm of radial play, and 0.05 mm to 0.2 mm circumferential play in the absence of any tilting or applied force.

The spring 17 is compressed between the rear face of the moving sleeve 28 and the frame 12.

Movement of the balls 31 in the moving grooves 30 is limited by front stops and back stops. During assembly, this enables the balls to be initially inserted radially into the moving grooves while the moving sleeve is still only partially engaged axially with the front of the fixed sleeve 33. The balls can then be slid axially backwards inside both the fixed and the moving grooves until they reach the ends of the moving grooves, and then the moving sleeve can be pushed home axially until it causes the spring 17 to engage the frame 12, which corresponds to the working position of the assembly when there is no axial force being applied thereto. The balls are free to drop inside the grooves until they reach the end stops.

A soft resilient filler material PR is used firstly to constitute the above-mentioned centering means for resiliently centering the balls, and secondly for protecting the mechanical system including the balls from the surrounding aggressive medium.

To enable this material to deform, compensation openings OC are made through the back of the fixed sleeve 33.

After the balls 31 have been inserted, the inside volume of the guide sleeve is filled with a priming liquid which is then removed, leaving an adherence-promoting coating on the walls of the volume. The liquid is naturally chosen to match the materials in use.

The liquid could alternatively be prior deposited on the parts that constitute the mechanism (eg. by spraying or by brushing), thereby enabling adequate drying.

The above-mentioned filling operation is then performed. To do this, the compensation openings OC are closed and the axis 22 is disposed vertically with the outlet openings directed upwardly and the balls 31 moving under gravity to the bottom ends of the grooves 30 with the moving sleeves being at the tops of their strokes and just touching the washers 17.

The initially highly-fluid liquid material is slowly poured into the outlet openings OS until they are full. Bubbles may be removed from the liquid by vacuum pumping and then returning to atmospheric pressure.

The resilient filler material then polymerizes at ambient temperature (or at a higher temperature to speed up the operation). The polymerized material is referenced PR in the figures.

Contrary to what might reasonably have been feared, it should be noted that experience shows that the resilient material does not hinder operation of the system. More particularly, it seems that at the beginning of system operation numerous chemical bonds within the material are broken in the zones where the balls 31 move in contact with the sides of the grooves 30 and 32, and where there are high stresses (eg. greater than 100 newtons per square millimeter ($N/mm^2$)). The filler product then behaves rather like a liquid, whereas in all other zones inside the protection enclosure, it retains its coherence as a solid.

Not only does the material avoid hindering the operation of the above-described system, it contributes directly to its operation. It serves as a centering means for keeping the balls 31 in a given plane, ie. in positions distributed about a circle which is coaxial with the fixed and moving sleeves when the sleeves are coaxial. This is the starting position from which the moving sleeve can tilt the most easily about any tilt axis.

Further, variations in the volume of the material PR inside the enclosure 33 due to movements of the working parts are made possible by elastic deformation of the material as cast through the compensation orifices OC without the material tearing or becoming unstuck from the metal walls.

Generally speaking the filler material should at least preferably satisfy the following conditions:

(1) the material should adhere excellently to the wall material (eg. metal) of the protection enclosure and of the link part, and if possible, the adherence should be at least as strong as the internal strength (in shear or in tension) of the material itself, ie. about 3 to 30 $N/mm^2$ (for traction); and (2) since the material will be subjected to internal tearing and extension stresses due to the movements of the system, the material should accommodate itself to these internal movements by means of high tearing strength, eg. between 20 and 200 N/cm, and should be capable of very great elongation (eg. 150% to 700%).

The internal mechanical work done by the material will generate heat which the material must be able to evacuate easily. Its thermal conductivity must therefore be as high as possible, by way of example 0.23 W/m°K, and in any case at least 0.1 W/m°K.

The movements of the mechanical system deform the filler material and thus induce opposing forces. The opposing forces should be as low as possible, and may be characterized by a low value Young's modulus, preferably in the range 0.5 to 20 N/mm$^2$.

The material may be selected from the range of special chlorosilanes or siloxanes sold by the French firm Rhône Poulenc under the trade mark Rhodorsil EVF.

In contrast, in spite of having suitable mechanical and adherence properties, natural rubbers and artificial elastomers such as polybutadiene are more difficult to use and could require very expensive equipment for their installation.

In a second assembly in accordance with the invention, and shown in FIGS. 4, 5, and 6, a filler material such as PR is not used for returning the balls to their home positions. The balls 31 are centered by the moving grooves 30 being replaced by substantially hemispherical cups 30C formed in the outer surface of the moving sleeve 22. The balls are free to rotate in the cups as they move along the fixed grooves 32.

It may be observed that in a mathematically idealized model without any play, it would be impossible for any tilting movements to take place. In practice, 2 microns of play is enough to ensure operation. This is much less play than is normally available. In the context of the present invention, play in the range 0.02 mm to 0.1 mm is preferred.

I claim:

1. An oscillating friction ring assembly for applying axial thrust to a shaft, the assembly comprising:

a first subassembly comprising rotary parts which are rotatable relative to an outer body and which are driven by a shaft which is itself rotatable about a shaft axis, the shaft axis defining an axial direction, and the first subassembly being suitable for transmitting axial thrust to the shaft; and a second subassembly comprising non-rotary parts connected to the said outer body in such a manner as to prevent the non-rotary parts from rotating about the said axis while enabling the non-rotary parts to transmit axial thrust to the said outer body, the said first and second subassemblies co-operating with each other to prevent large axial displacement of the shaft relative to the body while allowing the shaft to rotate relative to the body;

the said first subassembly and the said second subassembly each including a respective friction ring having a plane friction surface lying in a plane substantially perpendicular to the said axis, each friction surface being in the form of a circular annulus disposed coaxially about the shaft and being made of a hard material, and the friction surface of each subassembly being disposed to bear against the friction surface of the other subassembly, with each friction ring of the second subassembly including only one friction surface located at an axial end face of the friction ring referred to as a "front" end face, and with the axially opposite end face of the friction ring being referred to as a "rear" end face;

the friction ring of the said second subassembly being mounted in co-operation with a corresponding resilient thrust member engaging the rear face thereof to urge the friction ring axially forwardly to bear continuously against the friction ring of the said first subassembly, thereby enabling small axial displacements of the said friction rings relative to the said outer body;

a frame constituting a rear thrust point for the resilient thrust member;

means being provided to prevent the friction ring of the second subassembly from rotating about the said shaft axis relative to the said frame, and to guide axial displacement of the friction ring;

the improvement wherein the said second subassembly further includes:

a moving guide sleeve which is movable relative to the frame, the moving sleeve being coaxial with the said shaft and having the friction ring of the second subassembly rigidly fixed thereto; and a fixed guide sleeve which is fixed relative to the frame, the fixed sleeve being coaxial with and axially co-extensive with the moving sleeve, radial play being provided between the pair of sleeves to enable the moving ring to tilt slightly about an axis which is perpendicular to the said shaft axis, which intersects the shaft within the axial extent of the sleeves, and which may rotate about the shaft, where such tilting could be due, in particular, to the possibility of the surface of first subassembly friction ring being out-of-true, such that permanent axial thrust between the pair of friction rings transmits a wobble to the second subassembly friction ring;

the pair of sleeves including a plurality of pairs of adjacent ball-receiving housings hollowed out in their facing surfaces, with at least one of the housings in each pair being in the form of an axially extending groove;

a ball being placed in each of the said pairs of ball-receiving housings with sufficient play to enable easy axial sliding of the moving sleeve relative to the fixed sleeve by means of the balls rolling on the walls of the said grooves, but with the said play being small enough to prevent angular movement of the moving sleeve relative to the fixed sleeve about the axis of the said shaft, thereby constituting the said means for preventing the second subassembly friction ring from rotating, while additionally facilitating the said periodic tilting of the moving sleeve relative to the fixed sleeve;

ball-centering means being provided to cause the balls to be disposed around a circle which is coaxial with both the moving sleeve and the fixed sleeve when said sleeves are themselves coaxial, thereby enabling the moving sleeve to tilt about any tilt axis by appropriate movement of the balls in their housings.

2. An assembly according to claim 1, wherein each ball-receiving housing in said pairs of housings is constituted by a groove which is open towards the groove of the other housing of the pair, the said centering means being constituted by a soft and resilient filler material filling said grooves.

3. An assembly according to claim 2, wherein the grooves in the moving sleeve have first and second end stops to prevent the balls from escaping axially.

4. An assembly according to claim 2, wherein the said axial thrust member is compressed between the said frame and a rear face of the said moving sleeve, and wherein the forward and rearward displacement of the balls is limited by front and rear stops in the grooves in the moving sleeve, thereby enabling assembly of the assembly to comprise the following steps:

the moving sleeve is partially engaged axially with the fixed sleeve with the rear stops being engaged and with the front stops being disengaged;

the balls are inserted radially into respective grooves of the moving sleeve;

the balls are slid axially along the grooves into engagement with the fixed sleeve until they reach the rear stops; and the moving sleeve is pushed axially into engagement with the fixed sleeve against the resilient thrust member until the moving sleeve attains its working position.

5. An assembly according to claim 4, wherein the fixed sleeve surrounds the moving sleeve and the frame is fixed to the outer body, thereby facilitating assembly of the assembly around the shaft prior to the outer body being put into place.

6. An assembly according to claim 4, wherein the moving sleeve and the resilient thrust member are substantially symmetrical about the shaft axis.

7. An assembly according to claim 1, wherein the shaft is the turbine shaft of a downhole drill motor, the outer body is the tubular body of the turbine, and the frame which is fixed to the outer body is in the form of an annular plate having perforations to enable axial flow of the drilling mud which provides the motive power for the turbine.

8. An assembly according to claim 1, wherein one of the ball-receiving housings in each pair of ball-receiving housings is in the form of a substantially hemispherical cup in which the ball may rotate to run along the facing groove which constitutes the other ball-receiving housing of the pair, the set of cups being disposed around a circle which is coaxial with the sleeve in which the cups are formed whereby said cups constitute said centering means.

9. An assembly according to claim 1, wherein the said friction rings are designed and assembled in such a manner that the periodic tilt angle imposed on the friction ring of the second subassembly due to the maximum expected error in positioning the friction ring of the first subassembly is less than 1/100-th of a radian, thereby limiting the maximum reduction of the radial gap between facing ball-receiving grooves when the moving sleeve is tilted at said angle.

* * * * *